1 
US009486776B2

(12) United States Patent
Miyabe et al.

(10) Patent No.: US 9,486,776 B2
(45) Date of Patent: Nov. 8, 2016

(54) ADSORBENT MATERIAL AND METHOD FOR PRODUCING CRYSTALLINE SILICOTITANATE

(71) Applicant: NIPPON CHEMICAL INDUSTRIAL CO., LTD., Tokyo (JP)

(72) Inventors: Shinsuke Miyabe, Tokyo (JP); Yutaka Kinose, Tokyo (JP); Masahiro Kikuchi, Tokyo (JP); Takeshi Sakamoto, Tokyo (JP)

(73) Assignee: NIPPON CHEMICAL INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 14/787,516

(22) PCT Filed: Mar. 24, 2015

(86) PCT No.: PCT/JP2015/058864
§ 371 (c)(1),
(2) Date: Oct. 28, 2015

(87) PCT Pub. No.: WO2015/146962
PCT Pub. Date: Oct. 1, 2015

(65) Prior Publication Data
US 2016/0107140 A1    Apr. 21, 2016

(30) Foreign Application Priority Data
Mar. 27, 2014   (JP) ................. 2014-066149

(51) Int. Cl.
*B01J 20/10* (2006.01)
*B01J 20/28* (2006.01)
*B01J 20/30* (2006.01)
*C01B 33/32* (2006.01)
*C01B 33/36* (2006.01)
*G21F 9/12* (2006.01)
*C01G 23/00* (2006.01)
*C01B 33/20* (2006.01)

(52) U.S. Cl.
CPC ........... *B01J 20/10* (2013.01); *B01J 20/28016* (2013.01); *B01J 20/30* (2013.01); *C01B 33/20* (2013.01); *C01B 33/32* (2013.01); *C01B 33/36* (2013.01); *C01G 23/005* (2013.01); *G21F 9/12* (2013.01); *C01P 2002/72* (2013.01)

(58) Field of Classification Search
CPC ....................................................... B01J 20/10
USPC ............................................................ 252/175
See application file for complete search history.

(56) References Cited

U.S. PATENT DOCUMENTS

| | | | | |
|---|---|---|---|---|
| 5,989,434 | A | * | 11/1999 | Lundquist .......... B01J 20/28004 210/679 |
| 2003/0231994 | A1 | * | 12/2003 | Sylvester ................ B01J 39/02 423/3 |
| 2006/0167138 | A1 | * | 7/2006 | Ishii ....................... B82Y 30/00 523/200 |
| 2008/0202642 | A1 | * | 8/2008 | Sakamoto ............... B32B 15/01 148/525 |
| 2016/0107140 | A1 | * | 4/2016 | Miyabe .................... B01J 20/10 252/175 |

FOREIGN PATENT DOCUMENTS

| | | | | |
|---|---|---|---|---|
| GB | WO 9958243 | A2 | * 11/1999 | .............. B01J 39/02 |
| JP | 62-266499 | A |   11/1987 | |
| JP | 2001-522032 | A |   11/2001 | |
| JP | 2013-57599 | A |    3/2013 | |
| JP | 2013057599 | A | *  3/2013 | |
| JP | 2013-78725 | A |    5/2013 | |
| JP | 2014-29269 | A |    2/2014 | |

OTHER PUBLICATIONS (STIC, p. 90.) Jukka et al. 1989.*
(STIC, p. 60) A. Clearfield. 1999 seperation Science.*
International Search Report dated Jun. 30, 2015, issued in counterpart International Application No. PCT/JP2015/058864 (4 pages).
Ban et al., "Adsorption Properties of Cs by Inorganic Adsorbents in Sodium Chloride Solution", Japan Atomic Energy Agency Research, 2011, vol. 37, cited in the Specification, w/ English translation (36 pages).
Chapman et al., "Synthesis, characterization and crystal chemistry of microporous titanium-silicate materials", Zeolites, 1990, pp. 730-737, vol. 10, cited in the Specification.
Fujiwara, "Improvement and Evaluation of Micro-porous Crystals for Heat Pump Absorbents", Grants-in-Aid for Scientific Research (Kagaku Kenkyuhi Hojokin) Kenkya Seika Hokokusho, 2014, cited in the Specification and the ISR, w/ English translation (20 pages).
Oji et al. "Selective Removal of Strontium and Cesium from Simulated Waste Solution with Titanate Ion-exchangers in a Filter Cartridge Configurations.—12092", WM2012 Conference, 2012, pp. 1-17, cited in the ISR.

* cited by examiner

*Primary Examiner* — Nicole M Buie-Hatcher
*Assistant Examiner* — M. Reza Asdjodi
(74) *Attorney, Agent, or Firm* — Westerman, Hattori, Daniels & Adrian, LLP

(57) ABSTRACT

There is provided an adsorbent material having adsorptive removal properties of Cs and Sr in seawater, and a method for producing a crystalline silicotitanate suitable for the adsorbent material. The adsorbent material includes one selected from crystalline silicotitanates represented by $Na_4Ti_4Si_3O_{16} \cdot nH_2O$, $(Na_xK_{(1-x)})_4Ti_4Si_3O_{16} \cdot nH_2O$ and $K_4Ti_4Si_3O_{16} \cdot nH_2O$ wherein x represents a number of more than 0 and less than 1 and n represents a number of 0 to 8; and one selected from titanate salts represented by $Na_4Ti_9O_{20} \cdot mH_2O$, $(Na_yK_{(1-y)})_4Ti_9O_{20} \cdot mH_2O$ and $K_4Ti_9O_{20} \cdot mH_2O$ wherein y represents a number of more than 0 and less than 1 and m represents a number of 0 to 10. The adsorbent material is produced by a method for producing a crystalline silicotitanate in which a silicic acid source, a sodium compound and/or a potassium compound, titanium tetrachloride, and water are mixed to obtain a mixed gel, and the mixed gel is subjected to a hydrothermal reaction.

5 Claims, 6 Drawing Sheets

ADSORBENT MATERIAL AND METHOD FOR PRODUCING CRYSTALLINE SILICOTITANATE

BACKGROUND OF THE INVENTION

1. Field of the Invention

The present invention relates to an adsorbent material capable of selectively and efficiently separating and recovering cesium or strontium in seawater, and a method for producing a crystalline silicotitanate capable of being suitably used for the adsorbent material.

2. Description of the Related Art

As a process technology of wastewater containing radioactive substances, a coprecipitation process is conventionally known (see Patent Literature 1: Japanese Patent Laid-Open No. 62-266499). For radioactive cesium and radioactive strontium which are water-soluble, however, the coprecipitation process is not effective, and the adsorptive removal using an inorganic adsorbent material such as zeolite is carried out at present (see Patent Literature 2: Japanese Patent Laid-Open No. 2013-57599).

In the case where radioactive cesium and radioactive strontium flow out in seawater, however, there is known such a problem that an increase in the concentration of sodium being a seawater component acts in the direction of suppressing the ion-exchange reaction of cesium with an adsorbent material (see Non Patent Literature 1: JAEA-Research 2011-037).

One of inorganic adsorbent materials whose adsorbability of cesium and/or strontium has been studied so far includes crystalline silicotitanates. As the crystalline silicotitanates, there are known a plurality of ones having different compositions such as ones having a Ti/Si ratio of 1:1, 5:12, and 2:1; and besides, it is known that a crystalline silicotitanate having a Ti/Si ratio of 4:3 exists. Non Patent Literature 2 (ZEOLITES, 1990, Vol. 10, November/December) reports that products 3B and 3C produced by hydrothermal processes using an alkoxide being $Ti(OET)_4$ as a Ti source and a colloidal silica as a Si source have a three-dimensional 8-membered ring structure from their X-ray diffraction patterns, and that crystalline silicotitanates having the structure ideally have compositions represented by $M_4Ti_4Si_3O_{16}$ (M is Na, K and the like), and designates the crystalline silicotitanates having the structure as Grace titanium silicate (GTS-1). Further Non Patent Literature 3 (Keiko Fujiwara, "Modification and Evaluation of Microporous Crystals as Heat Pump Adsorbent Materials" (in Japanese), searched online <URL: http://kaken.nii.ac.jp/pdf/2011/seika/C-19/15501/21560846seika.pdf> on Mar. 3, 2014) describes the effect that a crystalline silicotitanate having a Ti/Si ratio of 4:3 is produced by subjecting a mixed solution having a Ti/Si ratio of 0.32 to a hydrothermal synthesis process. The Non Patent Literature describes the effect that the synthesized crystalline silicotitanate has a strontium ion-exchange capacity.

Although it is conventionally reported as described above that a crystalline silicotitanate having a Ti/Si ratio of 4:3 has a strontium exchange capacity, a further improvement of the adsorption performance of strontium and cesium is desired. Therefore, an object of the present invention is to provide an adsorbent material high in the adsorption performance of cesium and strontium also in seawater, and an industrially advantageous method for producing a crystalline silicotitanate effective as the adsorbent material.

SUMMARY OF THE INVENTION

As a result of exhaustive studies to solve the above-mentioned problem, the present inventors have found that a crystalline silicotitanate having the above-mentioned specific composition, in the case of comprising a specific titanate salt, has a high adsorption performance of cesium and strontium from seawater.

The present inventors have further found that a silicic acid source, a sodium compound and/or a potassium compound, titanium tetrachloride and water are added to thereby obtain a mixed gel having a specific Ti:Si ratio, and thereafter, the obtained mixed gel is subjected to a hydrothermal reaction to thereby efficiently obtain a crystalline silicotitanate useful as an adsorbent material for cesium and strontium from seawater, particularly a crystalline silicotitanate comprising the above-mentioned specific titanate salt.

That is, the present invention provides an adsorbent material for cesium or strontium, comprising at least one selected from crystalline silicotitanates represented by the general formulae: $Na_4Ti_4Si_3O_{16} \cdot nH_2O$, $(Na_xK_{(1-x)})_4Ti_4Si_3O_{16} \cdot nH_2O$ and $K_4Ti_4Si_3O_{16} \cdot nH_2O$ wherein x represents a number of more than 0 and less than 1 and n represents a number of 0 to 8; and at least one selected from titanate salts represented by the general formulae: $Na_4Ti_9O_{20} \cdot mH_2O$, $(Na_yK_{(1-y)})_4Ti_9O_{20} \cdot mH_2O$ and $K_4Ti_9O_{20} \cdot mH_2O$ wherein y represents a number of more than 0 and less than 1 and m represents a number of 0 to 10.

The present invention further provides a method for producing at least one selected from crystalline silicotitanates represented by the general formulae: $Na_4Ti_4Si_3O_{16} \cdot nH_2O$, $(Na_xK_{(1-x)})_4Ti_4Si_3O_{16} \cdot nH_2O$ and $K_4Ti_4Si_3O_{16} \cdot nH_2O$ wherein x represents a number of more than 0 and less than 1 and n represents a number of 0 to 8, the method comprising a first step of mixing a silicic acid source, a sodium compound and/or a potassium compound, titanium tetrachloride and water to thereby obtain a mixed gel, and a second step of subjecting the mixed gel obtained in the first step to a hydrothermal reaction, wherein in the first step, the silicic acid source and the titanium tetrachloride are added so that the molar ratio of Ti to Si contained in the mixed gel becomes Ti/Si=0.5 or higher and 3.0 or lower.

The present invention can provide an adsorbent material excellent in the adsorptive removal properties of cesium and strontium also in seawater, and can produce a crystalline silicotitanate effective as the adsorbent material by an industrially advantageous method.

DETAILED DESCRIPTION OF THE PREFERRED EMBODIMENTS

Figure 1:
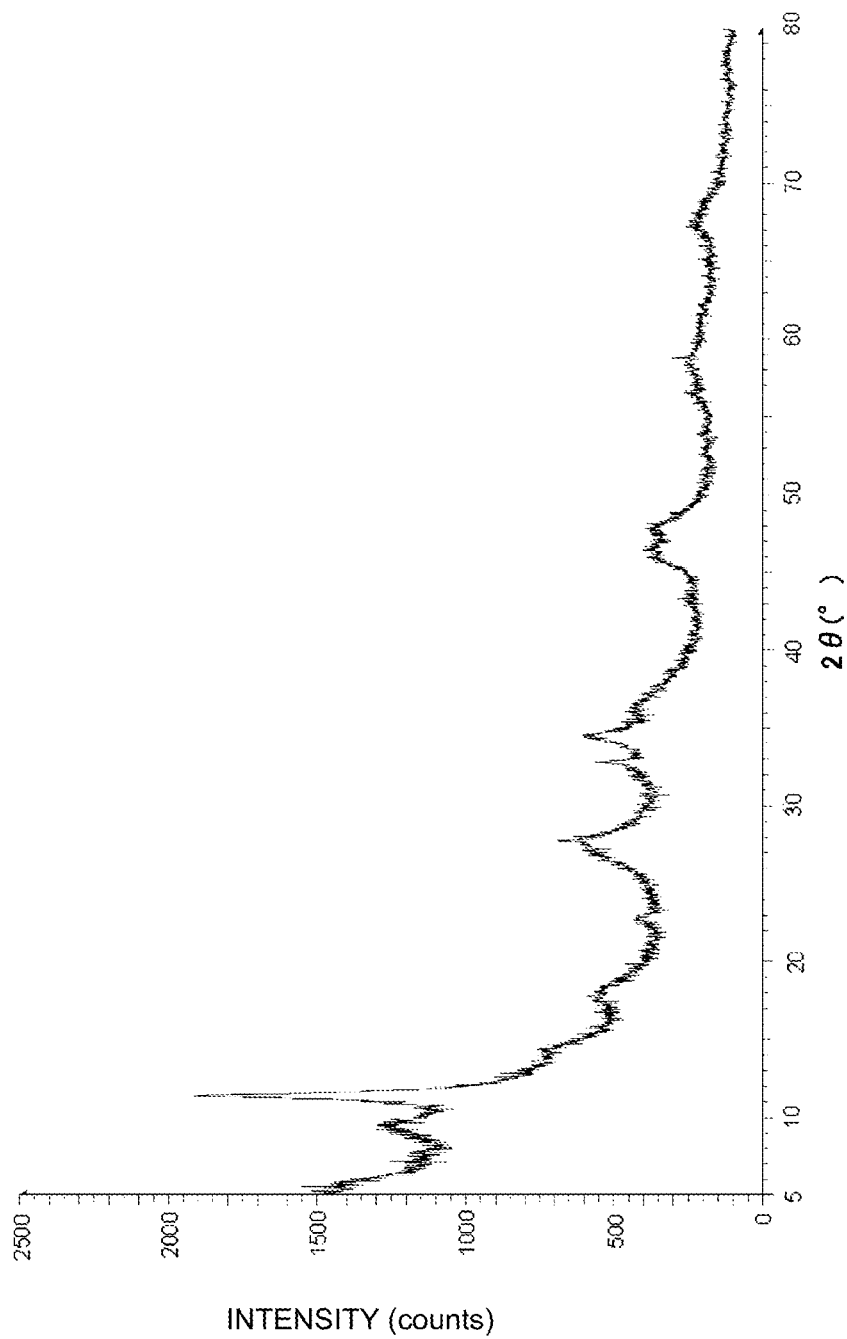
FIG. 1 is an X-ray diffraction chart of an adsorbent material (crystalline silicotitanate) obtained in Example 1 in the present invention.

The adsorbent material according to the present invention comprises: at least one (hereinafter, unless otherwise specified, referred to simply as "a crystalline silicotitanate" or "the crystalline silicotitanate") selected from crystalline silicotitanates represented by the general formulae: $Na_4Ti_4Si_3O_{16} \cdot nH_2O$, $(Na_xK_{(1-x)})_4Ti_4Si_3O_{16} \cdot nH_2O$ and $K_4Ti_4Si_3O_{16} \cdot nH_2O$ wherein x represents a number of more than 0 and less than 1 and n represents a number of 0 to 8; and at least one (hereinafter, unless otherwise specified, referred to simply as "a titanate salt" or "the titanate salt") selected from titanate salts represented by the general formulae: $Na_4Ti_9O_{20} \cdot mH_2O$, $(Na_yK_{(1-y)})_4Ti_9O_{20} \cdot mH_2O$ and $K_4Ti_9O_{20} \cdot mH_2O$ wherein y represents a number of more than 0 and less than 1 and m represents a number of 0 to 10. The present invention has one of its features in the point that the crystalline silicotitanate and the titanate salt are made to stably coexist and made into an adsorbent material. The adsorbent material according to the present invention, since having this feature, has an excellent adsorptive removal performance of cesium and strontium.

The form of the adsorbent material according to the present invention includes powdery forms, granular forms and molded bodies (spheroidal or columnar) other than granules, and preferably is a powdery or granular form. An adsorbent material in a powdery form can be obtained, for example, by producing the crystalline silicotitanate containing the titanate salt as a by-product by a production method described later. Further an adsorbent material in a granular form can be obtained by granulating a powdery adsorbent material by a granulation step described later.

The adsorbent material according to the present invention, when being subjected to an X-ray diffractometry, exhibits a specific diffraction peak pattern, reflecting the fact that the crystalline silicotitanate and the titanate salt made to stably coexist. This diffraction peak pattern will be described in detail hereinafter.

When the adsorbent material according to the present invention is subjected to an X-ray diffractometry using a Cu—Kα as an X-ray source and in a diffraction angle (2θ) range of 5 to 80°, one or more peaks of the crystalline silicotitanate are observed and one or more peaks of the titanate salt are observed.

When the adsorbent material according to the present invention is subjected to an X-ray diffractometry using the above-mentioned ray source and the above-mentioned diffraction angle range, the ratio of a height of the highest-intensity peak (hereinafter, referred to also as the main peak) among peaks of the titanate salt to a height of the main peak of the crystalline silicotitanate is preferably 5% or higher and 70% or lower, more preferably 5% or higher and 60% or lower, and still more preferably 5% or higher and 50% or lower. In order to produce an adsorbent material whose peak height ratio is in the above range, the production can be done, for example, by producing a crystalline silicotitanate by a production method described later, and at this time, regulating the material ratios of a silicic acid source, a sodium compound, a potassium compound, titanium tetrachloride and the like. The peak height ratio is calculated based on a diffraction peak pattern acquired by correcting a diffraction peak pattern acquired by an actual X-ray diffractometry for its base line. The base line correction is carried out using a Sonnevelt-Visser method. When peak heights are determined from the above diffraction peak pattern, the following procedure is made. First, two base points a peak has are connected to thereby obtain a straight line. Then, a vertical line is drawn from the apex of the peak, and is made to intersect the straight line; and the distance between the obtained intersecting point and the apex of the peak is taken as a peak height.

When the adsorbent material according to the present invention is subjected to an X-ray diffractometry using the above-mentioned ray source and in the above-mentioned diffraction angle range, it is preferable that the main peak of the titanate salt is observed at a diffraction angle (2θ) of 8 to 10°. The peak detected at 8 to 10° originates, out of the titanate salt, from a titanate salt having a crystal orientation of (010), and m of 5 to 7 in the general formula (2). Therefore, such an adsorbent material comprises a large amount of hydrate salt of m of 5 to 7 as the titanate salt. In order to produce an adsorbent material in which the main peak of the titanate salt is in the above diffraction angle range, the production can be done, for example, by producing a crystalline silicotitanate by a production method described later, and at this time, regulating the material ratios of a silicic acid source, a sodium compound, a potassium compound, titanium tetrachloride and the like.

In the case where the main peak of the titanate salt is detected in a diffraction angle (2θ) range of 8 to 10°, it is preferable that in addition to this diffraction angle range, peaks of the titanate salt are detected further in a range of 27 to 29° and/or in a range of 47 to 49°. Further, it is preferable that these peaks have heights of 10% or more and 70% or less of the above-mentioned height of the main peak of the titanate salt.

It is preferable that the main peak of the crystalline silicotitanate is observed in a diffraction angle (2θ) range of 10 to 13°. The peak detected in this range originates, out of the crystalline silicotitanate, from a crystalline silicotitanate having a crystal orientation of (0, 1, 0) and n of 5 to 7.

In the case where the main peak of the crystalline silicotitanate is detected in a diffraction angle (2θ) range of 10 to 13°, it is preferable that in addition to this diffraction angle range, peaks of the crystalline silicotitanate are detected further in a range of 27 to 29° and/or in a range of 34 to 35°. Further, it is preferable that these peaks have heights of 5% or more and 40% or less of the above-mentioned height of the main peak of the crystalline silicotitanate.

In the adsorbent material according to the present invention, the molar ratio (the crystalline silicotitanate:the titanate salt) of the titanate salt to the crystalline silicotitanate, obtained by a compositional analysis, is preferably 1:0.25 to 0.45, more preferably 1:0.30 to 0.40, and still more preferably 1:0.35 to 0.38. The molar ratio is determined specifically by the following method.

<A Method for Determining a Molar Ratio of a Crystalline Silicotitanate:a Titanate Salt>

(a) An adsorbent material is put in a suitable container (an aluminum ring or the like), interposed between dies, and then pressed at a pressure of 10 MPa by a pressing machine to be pelletized to thereby obtain a measurement sample. The sample is subjected to a total elemental measurement using an X-ray fluorescence apparatus (apparatus name: ZSX100e, tube: Rh (4 kW), atmosphere: vacuum, analysis window: Be (30 μm), measurement mode: SQX analysis (EZ scan), measurement diameter: 30 mmφ, manufactured by Rigaku Corp.). The contents (% by mass) of $SiO_2$ and TiO$_2$ in the adsorbent material are calculated by the SQX method being a semiquantitative analysis.

(b) The determined contents (% by mass) of SiO$_2$ and TiO$_2$ are divided by corresponding molecular weights to thereby obtain molar numbers of SiO$_2$ and TiO$_2$ in 100 g of the adsorbent material.

(c) One third of the molar number determined in the above of SiO$_2$ in the adsorbent material is assumed to be a molar number of the crystalline silicotitanate (at least one selected from crystalline silicotitanates represented by Na$_4$Ti$_4$Si$_3$O$_{16}$·nH$_2$O, (Na$_x$K$_{(1-x)}$)$_4$Ti$_4$Si$_3$O$_{16}$·nH$_2$O and K$_4$Ti$_4$Si$_3$O$_{16}$·nH$_2$O) in the adsorbent material. The molar number of the titanate salt in the adsorbent material is determined by the following expression (1) from that the molar number of Ti atoms in 1 mol of the crystalline silicotitanate is 4.

[Expression 1] (1)

$$\begin{aligned}\text{(A molar number of a titanate salt in an absorbent material)} &= \\ \text{(a molar number of TiO}_2\text{ contained in the}& \\ \text{titanate salt in the absorbent material)}/9 &= \\ \{\text{(the molar number of TiO}_2\text{ in the absorbent material)} -& \\ \text{(a molar number of SiO}_2\text{ in the absorbent material)} \times& \\ (4/3)\}/9&\end{aligned}$$

(d) The above ratio is obtained from the obtained molar numbers of the crystalline silicotitanate and the titanate salt.

The crystalline silicotitanate is at least one selected from crystalline silicotitanates represented by Na$_4$Ti$_4$Si$_3$O$_{16}$·nH$_2$O, (Na$_x$K$_{(1-x)}$)$_4$Ti$_4$Si$_3$O$_{16}$·nH$_2$O and K$_4$Ti$_4$Si$_3$O$_{16}$·nH$_2$O. The crystalline silicotitanate may be composed of only one out of these crystalline silicotitanates, or may be a mixture of two or more. Further among these, a crystalline silicotitanate represented by (Na$_x$K$_{(1-x)}$)$_4$Ti$_4$Si$_3$O$_{16}$·nH$_2$O may be a single compound having x of one value, or may be a mixture having x of two values. Further the crystalline silicotitanate may have n of one value alone, or may have n of two or more values mixed.

In the case where the crystalline silicotitanate comprises Na$_4$Ti$_4$Si$_3$O$_{16}$·nH$_2$O and K$_4$Ti$_4$Si$_3$O$_{16}$·nH$_2$O, or (Na$_x$K$_{(1-x)}$)$_4$Ti$_4$Si$_3$O$_{16}$·nH$_2$O, the crystalline silicotitanate easily become high in the degree of crystallinity, whereby the performance of the adsorbent material, particularly the adsorption performance of cesium may be allowed to be enhanced.

In the adsorbent material according to the present invention, the crystalline silicotitanate may comprise a crystalline silicotitanate other than A$_4$Ti$_4$Si$_3$O$_{16}$·nH$_2$O wherein A is Na, K or Na and K. When the adsorbent material according to the present invention is subjected to an X-ray diffractometry in a diffraction angle (2θ) range of 5 to 80°, however, it is preferable that with respect to the crystalline silicotitanate, there are observed, at least, no peak of a crystalline silicotitanate having a molar ratio of Ti and Si of 1:1, and no peak of a crystalline silicotitanate having a molar ratio of Ti and Si of 5:12. When the adsorbent material according to the present invention is subjected to an X-ray diffractometry in a diffraction angle (2θ) range of 5 to 80°, it is especially preferable that there are observed peaks of A$_4$Ti$_4$Si$_3$O$_{16}$·nH$_2$O only. Further when the adsorbent material according to the present invention is subjected to an X-ray diffractometry, it is preferable that no peak is observed at a 2θ of 25°, which is a peak of titanium oxide.

The titanate salt is at least one selected from titanate salts represented by Na$_4$Ti$_9$O$_{20}$·mH$_2$O, (Na$_y$K$_{(1-y)}$)$_4$Ti$_9$O$_{20}$·mH$_2$O and K$_4$Ti$_9$O$_{20}$·mH$_2$O.

The titanate salt may be composed of only one out of these titanate salts, or may be a mixture of two or more. Further among these, a titanate salt represented by (Na$_y$K$_{(1-y)}$)$_4$Ti$_9$O$_{20}$·mH$_2$O may be a single compound having y of one value, or may be a mixture of compounds having y of two values. Further the titanate salt may have m of one value alone, or may have m of two or more values mixed.

The adsorbent material according to the present invention may comprise a titanate salt other than A$_4$Ti$_9$O$_{20}$·mH$_2$O wherein A is Na, K or Na and K, for example, Na$_2$Ti$_3$O$_7$, but when the adsorbent material according to the present invention is subjected to an X-ray diffractometry using the above-mentioned ray source and in a diffraction angle (2θ) range of 5 to 80°, it is preferable that there is observed a diffraction peak of A$_4$Ti$_9$O$_{20}$·mH$_2$O only as titanate salts.

It is preferable from the viewpoint of more improving the selective adsorbability of cesium and strontium that the titanate salt comprises Na$_4$Ti$_9$O$_{20}$·mH$_2$O and K$_4$Ti$_9$O$_{20}$·mH$_2$O, or (Na$_y$K$_{(1-y)}$)$_4$Ti$_9$O$_{20}$·mH$_2$O.

Here, the value of y in a titanate salt represented by (Na$_y$K$_{(1-y)}$)$_4$Ti$_9$O$_{20}$·mH$_2$O and the value of x in a crystalline silicotitanate represented by (Na$_x$K$_{(1-x)}$)$_4$Ti$_4$Si$_3$O$_{16}$·nH$_2$O may be identical or different. The values of x and y are each independently more than 0 and less than 1, and any values in this range can be employed.

The amount ratio of Na and K of a crystalline silicotitanate and the amount ratio of Na and K of a titanate salt are somewhat presumable from the amount ratio of Na and K in the adsorbent material according to the present invention. With respect to the amount ratio of Na and K in the adsorbent material according to the present invention, when the sum of molar numbers of Na and K is taken to be 100, the proportion of the molar number of K is preferably 3 to 50, and more preferably 5 to 30. This proportion can be calculated, for example, by determining contents (% by mass) of Na$_2$O and K$_2$O in the adsorbent material by the total elemental measurement described in the above-mentioned (a) of <a method for determining a molar ratio of a crystalline silicotitanate:a titanate salt>.

The adsorbent material according to the present invention described in the above can be produced by the method for producing a crystalline silicotitanate according to the present invention described below. Specifically, the adsorbent material according to the present invention can be produced by the method for producing a crystalline silicotitanate in which in addition to crystalline silicotitanates represented by the above general formulae, there is produced, as a by-product, at least one selected from titanate salts represented by Na$_4$Ti$_9$O$_{20}$·mH$_2$O, (Na$_y$K$_{(1-y)}$)$_4$Ti$_9$O$_{20}$·mH$_2$O and K$_4$Ti$_9$O$_{20}$·mH$_2$O wherein y represents a number of more than 0 and less than 1 and m represents a number of 0 to 10. The production method according to the present invention, however, includes methods of not producing the titanate salt.

Hereinafter, the method for producing a crystalline silicotitanate according to the present invention will be described in detail.

A first step in the method for producing a crystalline silicotitanate according to the present invention is a step of mixing a silicic acid source, a sodium compound and/or a potassium compound, titanium tetrachloride, and water to thereby produce a mixed gel.

An example of the silicic acid source to be used in the first step includes soda silicate. The silicic acid source further includes also an active silicic acid obtained by cationically exchanging an alkali silicate (that is, an alkaline metal salt of silicic acid).

The active silicic acid is obtained, for example, by bringing an alkali silicate aqueous solution into contact with a cation-exchange resin and cationically exchanging the alkali silicate. As a raw material of the alkali silicate aqueous solution, a sodium silicate aqueous solution usually called water glass (water glass No. 1 to No. 4 or the like) is suitably used. This is comparatively inexpensive and easily available. Further in applications to semiconductors, which dislike Na ions, a potassium silicate aqueous solution is suitable as the raw material. There is also a method of dissolving a solid alkali metasilicate in water to thereby prepare an alkali silicate aqueous solution. Alkali metasilicates, since being produced through a crystallization step, include ones having a small amount of impurities. The alkali silicate aqueous solution is used, as required, by diluting with water.

As the cation-exchange resin to be used in the preparation of the active silicic acid, a well-known one can suitably be selected and used, and is not especially limited. In the contact step of the alkali silicate aqueous solution and the cation-exchange resin, for example, the alkali silicate aqueous solution is diluted with water so that the concentration of silica becomes 3% by mass or higher and 10% by mass or lower; then, the diluted alkali silicate aqueous solution is brought into contact with an H-type strong-acidity or weak-acidity cation-exchange resin to thereby dealkalize the alkali silicate. Further as required, the dealkalized solution is brought into contact with an OH-type strong-basicity anion-exchange resin to be deanionized. In this step, an active silicic acid aqueous solution is prepared. On details of the contact condition of an alkali silicate aqueous solution with a cation-exchange resin, various proposals have been already conventionally made; and in the present invention, any well-known contact condition thereof can be employed.

For example, in Non Patent Literature 3, a high-dispersion $SiO_2$ powder is used as a silicon source, whereas in the production method according to the present invention, soda silicate or an active silicic acid is used as a silicic acid source, whereby the present invention has an advantage of being capable of reducing the production cost by the use of a general-purpose silica raw material.

Examples of the sodium compound to be used in the first step include sodium hydroxide and sodium carbonate. Among these sodium compounds, since the use of sodium carbonate generates carbon dioxide gas, the use of sodium hydroxide, which generates no such gas, is preferable from the viewpoint of smoothly proceeding a neutralization reaction.

For example, in the case where in the first step, a sodium compound only is used out of a potassium compound and the sodium compound, as the crystalline silicotitanate, a crystalline silicotitanate represented by $Na_4Ti_4Si_3O_{16} \cdot nH_2O$ can be obtained. Further in this case, as a by-product, a sodium titanate represented by $Na_4Ti_9O_{20} \cdot mH_2O$ may be obtained.

Further for example, when the sodium compound and the potassium compound are used in the first step, as the crystalline silicotitanate, there can be obtained a crystalline silicotitanate containing $Na_4Ti_4Si_3O_{16} \cdot nH_2O$ and $K_4Ti_4Si_3O_{16} \cdot nH_2O$, or a crystalline silicotitanate containing $(Na_xK_{(1-x)})_4Ti_4Si_3O_{16} \cdot nH_2O$. Further in this case, as a by-product titanate salt, there may be obtained a titanate salt containing $Na_4Ti_9O_{20} \cdot mH_2O$ and $K_4Ti_9O_{20} \cdot mH_2O$, or a titanate salt containing $(Na_yK_{(1-y)})_4Ti_9O_{20} \cdot mH_2O$.

In the case where the sodium compound and the potassium compound are used in the first step, the proportion of the molar number of the potassium compound is, with respect to the total molar number of the sodium compound and the potassium compound, preferably 3 to 50%, and more preferably 5 to 30%. The potassium compound to be used in the first step includes potassium hydroxide and potassium carbonate; and for the same reason as for the sodium compound, potassium hydroxide is preferable.

In the method for producing a crystalline silicotitanate according to the present invention, titanium tetrachloride is used as a titanium source. In the case where another titanium compound such as titanium oxide is used as the titanium source, as exemplified in Comparative Example 1 described later, unreacted titanium oxide is liable to remain, and there is liable to be produced a crystalline silicotitanate other than a crystalline silicotitanate having a molar ratio of Ti:Si of 4:3. Thus, in the present invention, titanium tetrachloride is used as the titanium source.

It is also a feature of a method for producing a crystalline silicotitanate according to the present invention that the addition amounts of the silicic acid source and the titanium tetrachloride are made to be such amounts that Ti/Si being a molar ratio of Ti originated from the titanium tetrachloride in a mixed gel to Si originated from the silicic acid source therein becomes a specific ratio. For example, in Non Patent Literature 3, titanium tetrachloride is used as the titanium source, and a silicic acid source and the titanium tetrachloride are added in such amounts to a mixed solution so that the Ti/Si ratio becomes 0.32. By contrast, in the present invention, a silicic acid source and titanium tetrachloride are added in such amounts that the Ti/Si ratio becomes 0.5 or higher and 3.0 or lower. As a result of studies by the present inventors, it has been found that by setting the Ti/Si ratio in a mixed gel in the above-mentioned molar range, a crystalline silicotitanate represented by $A_4Ti_4Si_3O_{16} \cdot nH_2O$ and being high in the degree of crystallinity is easily obtained; and in the case where the crystalline silicotitanate is used as an adsorbent material, particularly the adsorption performance of cesium is improved. From this viewpoint, the Ti/Si ratio in the mixed gel is preferably 1.0 or higher and 3.0 or lower, more preferably 1.5 or higher and 2.5 or lower, and still more preferably 1.8 or higher and 2.2 or lower.

When in the mixed gel according to the present invention, the Ti/Si ratio is in the above-mentioned range, an obtained crystalline silicotitanate easily contains a specific titanate salt as a by-product, and is preferable also in the point that the adsorbent material according to the present invention can suitably be produced. Although in the case where a crystalline silicotitanate is usually used as an adsorbent material, it is general that its composition containing no by-product is employed, one of preferred aspects of the production method according to the present invention is that by employing thus comparatively high Ti/Si ratio to thereby positively produce a by-product, the adsorption performance of cesium and strontium is unexpectedly enhanced.

It is desirable that a silicic acid source and titanium tetrachloride are added so that the total concentration of a silicic acid source concentration in terms of $SiO_2$ in a mixed gel and a titanium tetrachloride concentration in terms of $TiO_2$ therein is 2.0% by mass or higher and 40% by mass or lower, and the molar ratio of $A'_2O$ to $SiO_2$ in the mixed gel is $A'_2O/SiO_2 = 0.5$ or higher and 3.0 or lower, wherein A' represents Na and K. By regulating the addition amounts of the silicic acid source and the titanium tetrachloride in the above ranges, the yield of a crystalline silicotitanate as a target can be raised to a satisfactory level, and the production of a product having a Ti/Si molar ratio of 1:1 can effectively be prevented.

These ranges are preferable also from the viewpoint of by-producing the titanate salt.

Titanium tetrachloride to be used in the first step is not especially limited as long as being industrially available.

In the first step, the silicic acid source, the sodium compound, the potassium compound and the titanium tetrachloride each can be added in a form of an aqueous solution to a reaction system. As the case may be, each may be added in a solid form. Further in the first step, as required, the concentration of the obtained mixed gel can be regulated by using pure water.

In the first step, the silicic acid source, the sodium compound, the potassium compound and the titanium tetrachloride can be added in various addition orders. For example, (1) the titanium tetrachloride is added to a mixture of the silicic acid source, the sodium compound and/or the potassium compound and water to thereby obtain a mixed gel (this addition order is hereinafter referred to simply as "carrying out of (1)" in some cases). The carrying out of (1) is preferable in the point of suppressing the generation of chlorine from the titanium tetrachloride.

As another addition order in the first step, there can also be employed (2) a mode in which the sodium compound and/or the potassium compound is added to a mixture of an aqueous solution of an active silicic acid (hereinafter, referred to simply as "active silicic acid" in some cases) obtained by cationically exchanging an alkali silicate, titanium tetrachloride and water. Also when this addition order is employed, a mixed gel can be obtained as in the carrying out of (1) (this addition order is hereinafter referred to simply as "carrying out of (2)" in some cases). The titanium tetrachloride can be added in an aqueous solution form thereof or in a solid form thereof. Similarly, also the sodium compound and the potassium compound can be added in their aqueous solution forms or solid forms.

In the carrying out of (1) and (2), the sodium compound and the potassium compound are added so that the total concentration in terms of $Na_2O$ of sodium and potassium in the mixed gel is preferably 0.5% by mass or higher and 15% by mass or lower, and especially preferably 0.7% by mass or higher and 13% by mass or lower. The total mass in terms of $Na_2O$ mass of sodium and potassium in the mixed gel, and the total concentration (hereinafter referred to as "concentration of sodium and potassium (in the case of using no potassium compound in the first step, sodium concentration)") in terms of $Na_2O$ of sodium and potassium in the mixed gel are calculated by the following expressions.

A total mass in terms of $Na_2O$ mass of sodium and potassium in a mixed gel ($g$)=(a molar number of sodium ions originated from soda silicate+a molar number of sodium ions originated from a sodium compound such as sodium hydroxide+a molar number of potassium ions originated from a potassium compound such as potassium hydroxide−a molar number of chloride ions originated from titanium tetrachloride)×0.5×the molecular weight of $Na_2O$ A total concentration in terms of $Na_2O$ of sodium and potassium in the mixed gel (% by mass)= the total mass in terms of $Na_2O$ mass of sodium and potassium in the mixed gel/(a moisture amount in the mixed gel+the total mass in terms of $Na_2O$ mass of sodium and potassium in the mixed gel)×100

By combining the selection of a silicic acid source and the regulation of the total concentration of sodium and potassium in the mixed gel, there can be suppressed the production of crystalline silicotitanates other than a crystalline silicotitanate having a molar ratio of Ti:Si of 4:3. In the case where soda silicate is used as the silicic acid source, by making the soda silicate concentration in terms of $Na_2O$ to be 2.8% by mass or higher, the production of a crystalline silicotitanate having a molar ratio of Ti:Si of 5:12 can be effectively suppressed; on the other hand, by making the total concentration in terms of $Na_2O$ of sodium and potassium in the mixed gel to be 4.5% by mass or lower, the production of a crystalline silicotitanate having a molar ratio of Ti:Si of 1:1 can be effectively suppressed. Further in the case where an active silicic acid obtained by cationically exchanging an alkali silicate is used as the silicic acid source, by making the active silicic acid concentration in terms of $Na_2O$ to be 1% by mass or higher, the production of a crystalline silicotitanate having a molar ratio of Ti:Si of 5:12 can be effectively suppressed; on the other hand, by making the total concentration in terms of $Na_2O$ of sodium and potassium in the mixed gel to be 6% by mass or lower, the production of a crystalline silicotitanate having a molar ratio of Ti:Si of 1:1 can be effectively suppressed.

Here, in the case where sodium silicate is used as the silicic acid source, the sodium component in the sodium silicate becomes a sodium source simultaneously in the mixed gel. Therefore, "the mass (g) in terms of $Na_2O$ of sodium in the mixed gel" used herein is counted as a sum of all sodium components in the mixed gel.

In the carrying out of (1) and (2), it is desirable that the addition of titanium tetrachloride is carried out by adding stepwise or continuously as a titanium tetrachloride aqueous solution over a certain time in order to obtain a homogeneous gel. Hence, for the addition of titanium tetrachloride, a Perista pump or the like can suitably be used.

It is preferable in the point of obtaining a homogeneous product that the mixed gel obtained in the first step is subjected to aging over a time of 0.5 hour or more and 2 hours or less at 30° C. or higher and 100° C. or lower before being subjected to a hydrothermal reaction as a second step described later. The aging step may be carried out, for example, in a still-standing state, or in a stirring state using a line mixer or the like.

In the present invention, the above mixed gel obtained in the first step is subjected to a hydrothermal reaction, which is a second step, to thereby obtain a crystalline silicotitanate. The hydrothermal reaction suffices and is not limited even under any condition as long as the condition is capable of synthesizing the crystalline silicotitanate. The reaction is usually carried out in an autoclave preferably at temperatures of 120° C. or higher and 300° C. or lower, more preferably at 120° C. or higher and 200° C. or lower, and still more preferably at 140° C. or higher and 180° C. or lower, preferably over 6 hours or more and 72 hours or less, and more preferably over 12 hours or more and 36 hours or less, under a pressure. The reaction time can be selected according to the scale of a synthesizing apparatus.

The crystalline silicotitanate in a hydrous state obtained in the second step is dried, and the obtained dried material can be, as required, disintegrated or ground to thereby make the material in a powdery form (including a particulate form). The crystalline silicotitanate in a hydrous state is further extruded from a hole member having a plurality of holes formed therein to thereby obtain rod-form molded bodies; and the obtained rod-form molded bodies are dried and may be made into a pillar-form; or the dried rod-form molded bodies may be molded into a spherical form, or disintegrated or ground to be thereby made into a particulate form. In the latter case, that is, in the case of carrying out the extrusion before drying, there can be raised the yield of crystalline silicotitanates recovered by a classification method described later. Here, the disintegration refers to an operation of loosening fine particles having gathered and turned into lumps; and the grinding refers to an operation of exerting a mechanical force on loosened solid particles to thereby make the particles finer.

The shape of the holes formed in the hole member includes a circular shape, a triangular shape, a polygonal shape, and an annular shape. The diameter in terms of a true circle of the holes is preferably 0.1 mm or larger and 10 mm or smaller, and more preferably 0.3 mm or larger and 5 mm or smaller. The diameter in terms of a true circle used herein is a diameter of a circle calculated from an area of a hole in the case where the circle has the same area as the hole. The drying temperature after the extrusion can be made to be, for example, 50° C. or higher and 200° C. or lower. Further the drying time can be made to be 1 hour or more and 120 hours or less.

The dried rod-form molded body may be used as it is as an adsorbent material, or may be used by being slightly loosened. Further the dried rod-form molded body may be used by being ground. It is preferable from the viewpoint of enhancing the adsorption efficiency of cesium and/or strontium, and the like that powdery crystalline silicotitanates obtained by these methods are further classified and used as an adsorbent material. It is preferable that the classification uses, for example, a first sieve having a nominal sieve opening of 1,000 μm or smaller as prescribed in JIS Z8801-1, particularly 710 μm or smaller. Further, it is also preferable that the classification uses a second sieve having a nominal sieve opening of 100 μm or larger, particularly 300 μm or larger. Further, it is preferable that the classification uses the first sieve and the second sieve.

A crystalline silicotitanate obtained by the production method according to the present invention is at least one selected from crystalline silicotitanates represented by the general formulae: $Na_4Ti_4Si_3O_{16} \cdot nH_2O$, $(Na_xK_{(1-x)})_4Ti_4Si_3O_{16} \cdot nH_2O$ and $K_4Ti_4Si_3O_{16} \cdot nH_2O$ wherein x represents a number of more than 0 and less than 1 and n represents a number of 0 to 8. The crystalline silicotitanate obtained by the production method according to the present invention has a first feature, as is clear from these general formulae, in the point of a molar ratio of Ti:Si of 4:3. It can be confirmed by a structural analysis using an X-ray diffractometry of the crystalline silicotitanate that the molar ratio of Ti:Si in the crystalline silicotitanate is this value.

The crystalline silicotitanate obtained by the production method according to the present invention has a second feature in the point of containing no titanium oxide as impurities. That the crystalline silicotitanate contains no titanium oxide can be confirmed by that no peak at $2\theta=25°$, which is a peak of the titanium oxide, is detected in diffraction peaks acquired by an X-ray diffractometry of the crystalline silicotitanate.

The crystalline silicotitanate obtained by the production method according to the present invention comprises, as main components, crystalline silicotitanates represented by the general formulae: $Na_4Ti_4Si_3O_{16} \cdot nH_2O$, $(Na_xK_{(1-x)})_4Ti_4Si_3O_{16} \cdot nH_2O$ and $K_4Ti_4Si_3O_{16} \cdot nH_2O$ and having a molar ratio of Ti:Si of 4:3, and may comprise other crystalline silicotitanates in the range not impairing the advantage of the present invention. There are allowed to be contained by-products of titanate salts originated from the present production method, such as sodium titanate ($Na_4Ti_9O_{20}$) or a hydrous salt thereof. Since these titanate salts may rather become components to improve the adsorptive removal properties of strontium, in the case of using the crystalline silicotitanate as an adsorbent material to simultaneously remove cesium and strontium, these sorts of compounds can be said to be preferable by-products, in the production method according to the present invention.

A crystalline silicotitanate obtained by the production method according to the present invention, particularly the crystalline silicotitanate containing the titanate salt is excellent in the adsorptive removal properties of cesium and/or strontium. By making use of these properties, the crystalline silicotitanate is molded and processed, as required, according to a usual method, and a molded body thus obtained can suitably be used as an adsorbent material for cesium and/or strontium.

Examples of the molding and processing include a method in which a powdery crystalline silicotitanate or a powdery adsorbent material comprising it is subjected to a granulation processing in order to being molded into a granular form, or a powdery crystalline silicotitanate is made into a slurry and dropped in a liquid containing a hardener such as calcium chloride to thereby capsulate the crystalline silicotitanate, a method in which the surface of a resin core material is subjected to an impregnation and coating treatment with a crystalline silicotitanate powder, and a method in which a powdery crystalline silicotitanate or a powdery adsorbent material comprising it is adhered and fixed on and/or in a sheet-form base material formed of a natural fiber or a synthetic fiber to be thereby made into a sheet-form. Methods of granulation processing include well-known methods, and examples thereof include agitation and mixing granulation, tumbling granulation, extrusion granulation, crushing granulation, fluidized bed granulation, spray drying granulation, and compression granulation. In the course of the granulation, as required, a binder and a solvent may be added and mixed. The binders include well-known ones, for example, polyvinyl alcohol, polyethylene oxide, hydroxyethylcellulose, hydroxypropylcellulose, hydroxypropylmethylcellulose, hydroxyethylmethylcellulose, carboxymethylcellulose, hydroxypropylmethylcellulose, methylcellulose, ethylcellulose, starch, cornstarch, molasses, lactose, gelatin, dextrin, gum arabic, alginic acid, polyacrylic acid, glycerol, polyethylene glycol, and polyvinylpyrrolidone. As the solvent, various types thereof including aqueous ones and organic ones can be used.

A granular material obtained by subjecting a crystalline silicotitanate in a hydrous state obtained by the production method according to the present invention to a granulation processing can suitably be used as adsorbent materials for an adsorption vessel packed with a radioactive substance adsorbent material and for a water treatment system having an adsorption column.

In this case, it is preferable that the shape and the size of the granular material obtained by subjecting a crystalline silicotitanate in a hydrous state to a granulation processing can suitably be regulated so as to adapt to flow of a water to be treated containing cesium and/or strontium through an adsorption vessel or a packed column packed therewith.

Further a granular material obtained by subjecting a crystalline silicotitanate in a hydrous state obtained by the production method according to the present invention to a granulation processing, by further incorporating magnetic particles, can be used as an adsorbent material capable of recovering cesium and/or strontium from water containing cesium and/or strontium by magnetic separation. Examples of the magnetic particles include powders of metals such as iron, nickel and cobalt, and magnetic alloys containing these as main components, and powders of metal oxide magnetic bodies such as triiron tetraoxide, diiron trioxide, cobalt-added iron oxide, barium ferrites and strontium ferrites.

As a method of incorporating the magnetic particles to the granular material obtained by subjecting the crystalline silicotitanate in a hydrous state to a granulation processing, the incorporation can be made, for example, by carrying out the above-mentioned granulation processing operation in the state of the magnetic particles being incorporated.

According to the production method according to the present invention, there can efficiently be produced the adsorbent material according to the present invention comprising the crystalline silicotitanate and the titanate salt, but the adsorbent material according to the present invention may be produced by separately producing the crystalline silicotitanate and the titanate salt, and mixing these in an optional formulation.

EXAMPLES

Hereinafter, the present invention will be described specifically by way of Examples and Comparative Examples, but the present invention is not limited thereto. Unless otherwise specified, "%" represents "% by mass". Evaluation apparatuses and materials used in Examples and Comparative Examples are as follows.
<Evaluation Apparatuses>
X-ray diffraction: As an apparatus, a D8 AdvanceS manufactured by Bruker Corp. was used. As a ray source, a Cu—Kα was used. The measurement conditions were made to be a tube voltage of 40 kV, a tube current of 40 mA, and a scanning rate of 0.1°/sec. ICP-AES: 720-ES, manufactured by Varian, Inc. was used. An adsorption test of Cs and Sr was carried out by setting the measuring wavelength of Cs at 697.327 nm and the measuring wavelength of Sr at 216.596 nm. As standard samples, there were used aqueous solutions containing 0.3% of NaCl, and 100 ppm, 50 ppm and 10 ppm of Cs, and aqueous solutions containing 0.3% of NaCl, and, 100 ppm, 10 ppm and 1 ppm of Sr.
<Materials Used>
No. 3 soda silicate: manufactured by Nippon Chemical Industrial Co., Ltd., ($SiO_2$: 28.96%, $Na_2O$: 9.37%, $H_2O$: 61.67%, $SiO_2/Na_2O$=3.1)
A caustic soda aqueous solution: an industrial 25% sodium hydroxide (NaOH: 25%, $H_2O$: 75%)
A caustic potash: a solid reagent potassium hydroxide (KOH: 85%)
A titanium tetrachloride aqueous solution: a 36.48% aqueous solution, manufactured by OSAKA Titanium Technologies Co., Ltd. (in Examples 4 to 6, the solution was used in which the concentration was made to be 15.3%)
A titanium dioxide: ST-01, manufactured by Ishihara Sangyo Kaisha Ltd.
A mimic seawater: A 0.3%-NaCl aqueous solution containing 100 ppm of Cs and Sr each was made to be a mimic seawater. The mimic seawater was obtained by mixing 3.0151 g of NaCl (99.5%), 0.3074 g of $SrCl_2 \cdot 6H_2O$ (99%), 0.1481 g of $CsNO_3$ (99%), and 996.5294 g of $H_2O$.

Example 1

Synthesis of an Adsorbent Material (Crystalline Silicotitanate)

(1) A First Step 90 g of the No. 3 soda silicate, 667.49 g of the caustic soda aqueous solution and 84.38 g of pure water were mixed and stirred to thereby obtain a mixed aqueous solution. 443.90 g of the titanium tetrachloride aqueous solution was added continuously over 1 hour and 20 min to the mixed aqueous solution by a Perista pump to thereby produce a mixed gel. The mixed gel was, after the titanium tetrachloride aqueous solution was added, allowed to stand still for aging over 1 hour at room temperature. The molar ratio of Ti and Si in the mixed gel at this time was Ti:Si=2:1. Further, the concentration of $SiO_2$ in the mixed gel was 5.3%; the concentration of $TiO_2$ therein was 5.3%; and the sodium concentration therein in terms of $Na_2O$ was 3.22%.

(2) A Second Step

Figure 2:
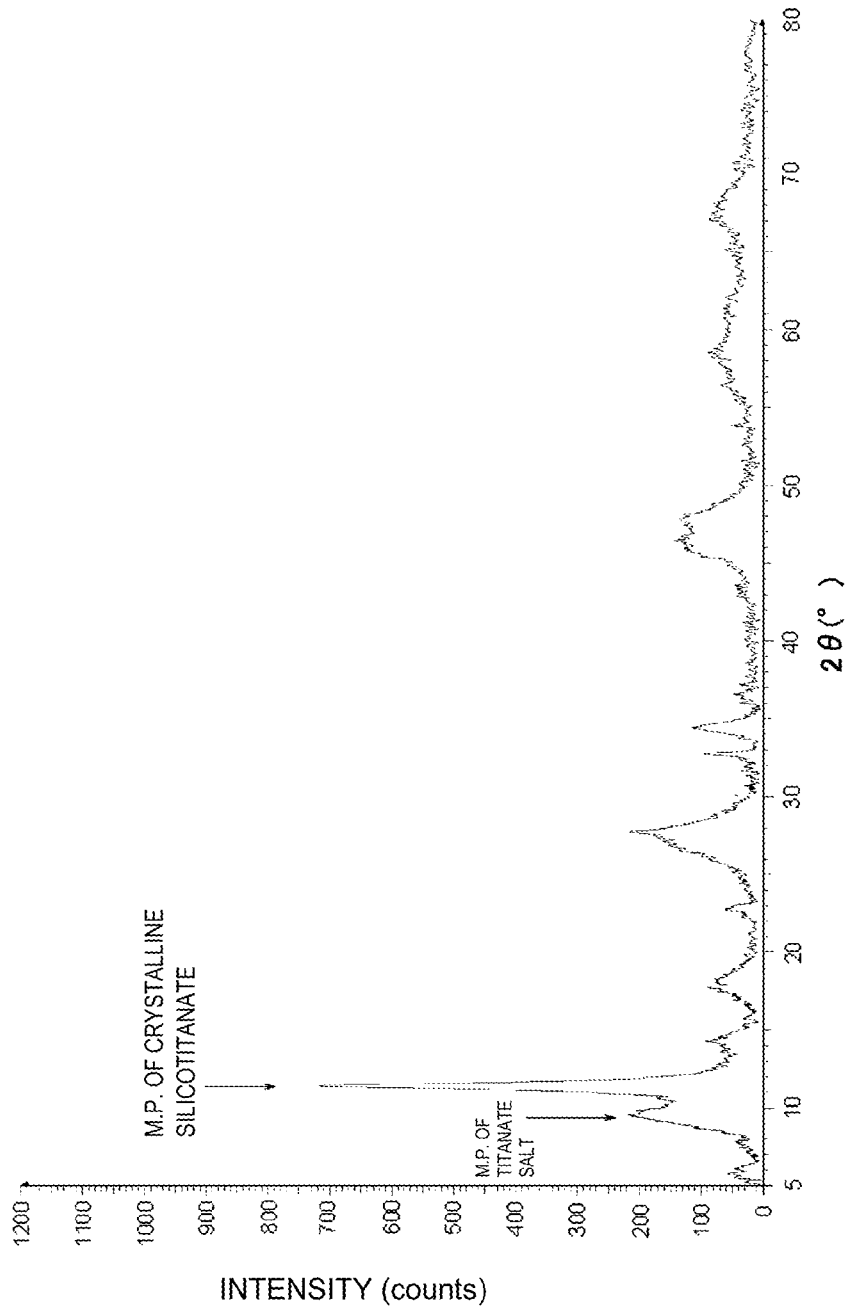
FIG. 2 is an X-ray diffraction chart after base line correction of the adsorbent material (crystalline silicotitanate) obtained in Example 1 in the present invention.

The mixed gel obtained in the first step was put in an autoclave; the temperature therein was raised to 170° C. over 1 hour; and while the temperature was maintained, the reaction was carried out under stirring for 24 hours. A slurry after the reaction was filtered, cleaned and dried to thereby obtain an adsorbent material (crystalline silicotitanate). The composition of the obtained adsorbent material estimated from an X-ray diffraction structure thereof is shown in the following Table 1. Further, an X-ray diffraction chart of the obtained adsorbent material is shown in FIG. 1. There is shown in FIG. 2 an X-ray diffraction chart acquired by correcting the X-ray diffraction chart of the obtained adsorbent material for the base line by the above-mentioned method. As shown in FIG. 1 and FIG. 2, in these X-ray diffraction charts, the main peak (M.P.) (originated from $Na_4Ti_4Si_3O_{16} \cdot 6H_2O$, the same is applied also to Examples 2 and 3 hereinafter) of the crystalline silicotitanate was detected in a range of $2\theta$=10 to 13°, and the main peak (originated from $Na_4Ti_9O_{20} \cdot 5$ to $7H_2O$, the same is applied also to Examples 2 and 3 hereinafter) of sodium titanate being the titanate salt was detected in a range of $2\theta$=8 to 10°. Based on the X-ray diffraction chart after the correction shown in FIG. 2, there was determined the ratio (%) of a height of the main peak of the sodium titanate to a height of the main peak of the crystalline silicotitanate. The result is shown in Table 2. Further the obtained adsorbent material was analyzed for its composition by the above-mentioned method, and the molar ratio of the crystalline silicotitanate and the sodium titanate was determined by the above-mentioned method. These results are shown in Table 2.
<Adsorption Test of Cs and Sr>
2.00 g of the obtained adsorbent material (crystalline silicotitanate) was taken in a 100-ml poly container; 100.00 g of the mimic seawater was added; the lid was put on; and the mixture was well shaken and mixed. Thereafter, the mixture was allowed to stand still, and after the lapse of 1 hour, the mixture was again shaken and mixed; about 50 ml of the mixture was filtered with a No. 5C filter paper, and a filtrate obtained by the filtration was sampled. The rest of 50 ml was allowed to stand still as it was, and further after 23 hours (after 24 hours after the first shaking), the mixture was again shaken and mixed. Then, the mixture was filtered with a No. 5C filter paper, and a filtrate obtained by the filtration was sampled. With the sampled filtrates being as subjects, the contents of Cs and Sr in the filtrates were measured using the ICP-AES. The results are shown in the following Table 3.

Example 2

Figure 3:
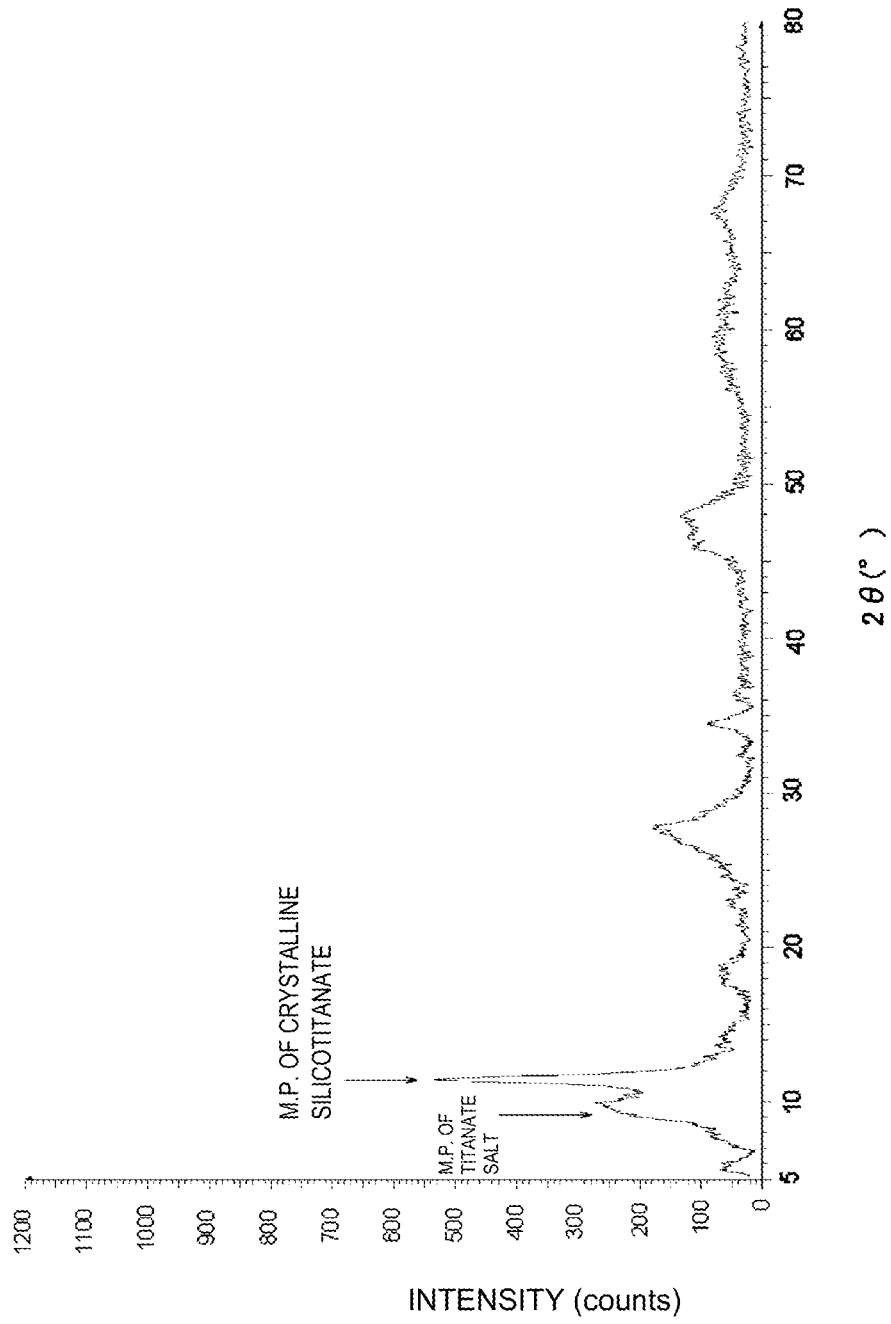
FIG. 3 is an X-ray diffraction chart after base line correction of an adsorbent material (crystalline silicotitanate) obtained in Example 2 in the present invention.

146 g of the No. 3 soda silicate was subjected to a sodium-removal treatment by cation-exchange to thereby obtain 1,000 g of a 4.16% active silicic acid aqueous solution. The cation-exchange used Amberlite IR-120B, which is a weak-acidity cation-exchange resin. 720.18 g of the titanium tetrachloride aqueous solution was added to the active silicic acid aqueous solution under stirring over 4 hours to thereby obtain a mixed aqueous solution. 1107.85 g of the caustic soda aqueous solution was added to the mixed aqueous solution, and stirred for 60 min to thereby produce a mixed gel. The mixed gel was, after the addition of the caustic soda aqueous solution, allowed to stand still for 1 hour at room temperature for aging. The molar ratio of Ti and Si in the mixed gel at this time was Ti:Si=2:1. The concentration of $SiO_2$ in the mixed gel was 1.47%; the concentration of $TiO_2$ therein was 3.91%; and the sodium concentration in terms of $Na_2O$ was 1.82%. An adsorbent material (crystalline silicotitanate) was obtained thereafter as in Example 1. An X-ray diffraction chart of the obtained adsorbent material after the base line correction is shown in FIG. 3. As shown in FIG. 3, in the X-ray diffraction chart, the main peak of a crystalline silicotitanate and the main peak of sodium titanate were detected in the same diffraction angle ranges as in the adsorbent material obtained in Example 1. The obtained adsorbent material (crystalline silicotitanate) was subjected to the same analysis and the same adsorption test as in Example 1. The composition estimated from an X-ray diffraction structure of the obtained adsorbent material is shown in Table 1. Further, the height ratio of the main peaks acquired from FIG. 3 and the molar ratio obtained in the compositional analysis are shown in Table 2. The results of the adsorption test of Cs and Sr are shown in the following Table 3.

Example 3

Figure 4:
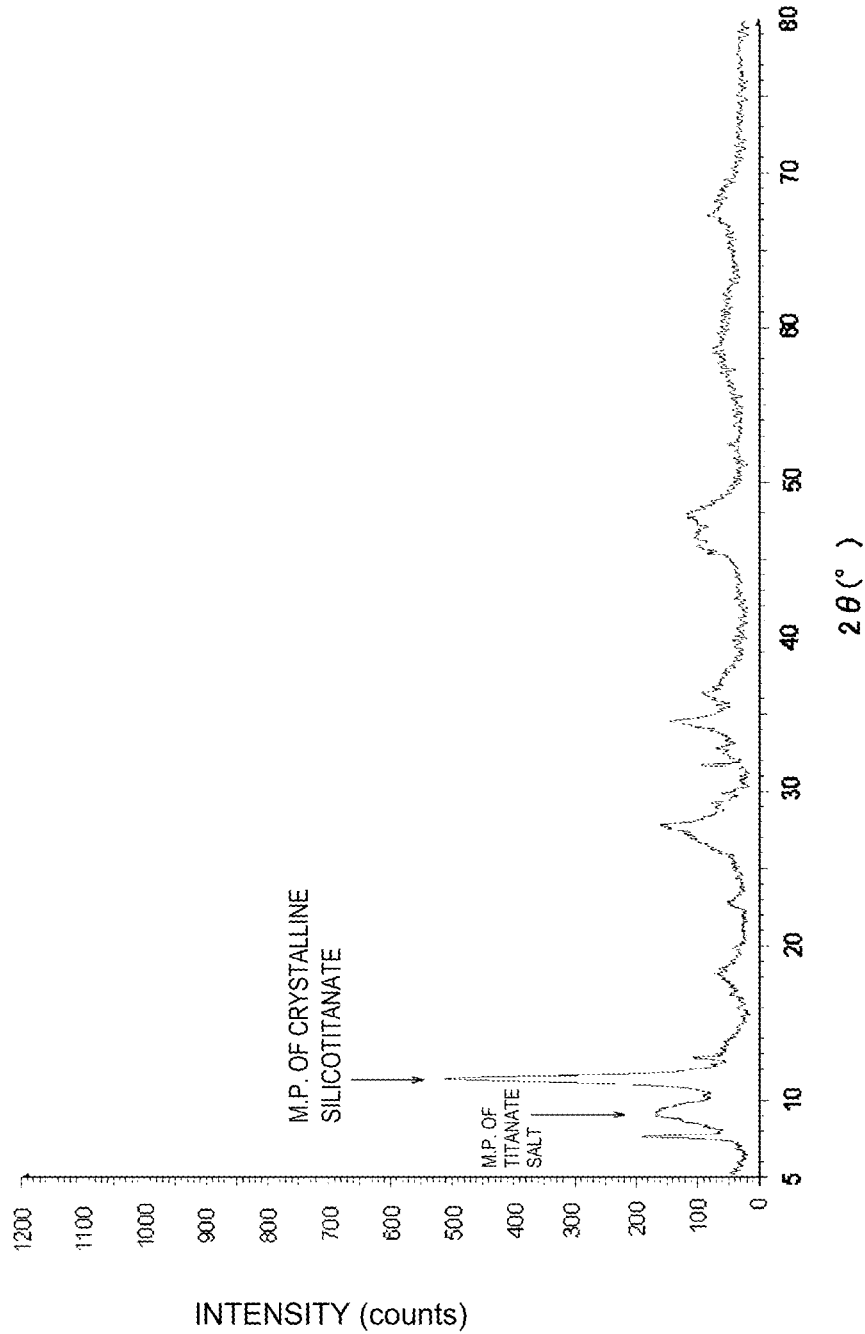
FIG. 4 is an X-ray diffraction chart after base line correction of an adsorbent material (crystalline silicotitanate) obtained in Example 3 in the present invention.

A mixed gel was produced as in Example 1, except for altering the addition amount of pure water in the mixed gel to 361.30 g, and an adsorbent material (crystalline silicotitanate) was produced from the mixed gel. The molar ratio of Ti and Si in the mixed gel was Ti:Si=2:1. The concentration of $SiO_2$ in the mixed gel was 1.67%; the concentration of $TiO_2$ therein was 4.36%; and the sodium concentration in terms of $Na_2O$ was 2.51%. An X-ray diffraction chart of the obtained adsorbent material after the base line correction is shown in FIG. 4. As shown in FIG. 4, in the X-ray diffraction chart, the main peak of a crystalline silicotitanate and the main peak of a titanate salt were detected in the same diffraction angle ranges as in the adsorbent material obtained in Example 1. The obtained adsorbent material (crystalline silicotitanate) was subjected to the same analysis and the same adsorption test as in Example 1. The composition estimated from an X-ray diffraction structure of the obtained adsorbent material is shown in the following Table 1. Further, the height ratio of the main peaks acquired from FIG. 4 and the molar ratio obtained in the compositional analysis are shown in Table 2. The results of the adsorption test of Cs and Sr are shown in the following Table 3.

Comparative Example 1

Figure 5:
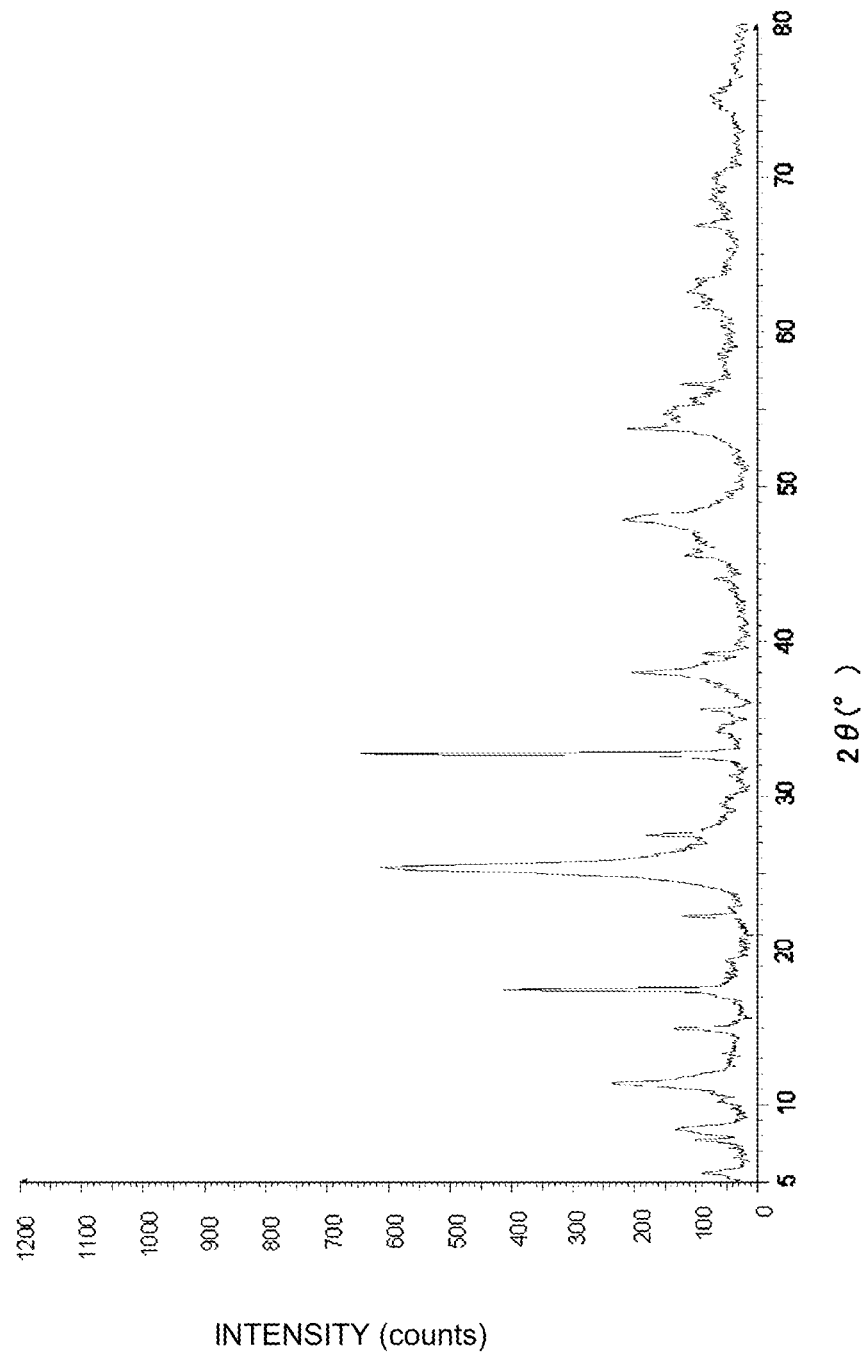
FIG. 5 is an X-ray diffraction chart after base line correction of an adsorbent material (crystalline silicotitanate) obtained in Comparative Example 1 in the present invention.

The present Comparative Example is an example using titanium dioxide in place of titanium tetrachloride as a titanium source. 90 g of the No. 3 soda silicate, 121.2 g of the caustic soda aqueous solution and 776.1 g of pure water were mixed and stirred to thereby obtain a mixed aqueous solution. 68.2 g of titanium dioxide in place of the titanium tetrachloride aqueous solution was added to the mixed aqueous solution. Except for this, a mixed gel was produced as in Example 1, and an adsorbent material (crystalline silicotitanate) was produced from the mixed gel. The molar ratio of Ti and Si in the mixed gel was Ti:Si=2:1. The concentration of $SiO_2$ in the mixed gel was 2.47%; the concentration of $TiO_2$ therein was 6.46%; and the sodium concentration in terms of $Na_2O$ was 3.32%. The obtained adsorbent material (crystalline silicotitanate) was subjected to the same analysis and the same adsorption test as in Example 1. An X-ray diffraction chart of the obtained adsorbent material (crystalline silicotitanate) after the base line correction is shown in FIG. 5. The composition estimated from an X-ray diffraction structure of the obtained adsorbent material (crystalline silicotitanate) is shown in the following Table 1. As a result, the presence of titanium oxide was confirmed as an impurity. The results of the adsorption test of Cs and Sr are shown in the following Table 3.

TABLE 1

| | Ti:Si Molar Ratio | Concentration A in terms of $SiO_2$ (%) | Concentration B in terms of $TiO_2$ (%) | A + B | Concentration in terms of $Na_2O$ (%) | X-Ray Diffraction Structure |
|---|---|---|---|---|---|---|
| Example 1 | 2:1 | 2.00 | 5.30 | 7.30 | 3.22 | The main phase $Na_4Ti_4Si_3O_{16} \cdot 6H_2O$, and $Na_4Ti_9O_{20} \cdot 5$ to $7H_2O$ were detected. The other crystalline silicotitanates and $TiO_2$ were undetected. |
| Example 2 | 2:1 | 1.47 | 3.91 | 5.38 | 1.82 | The main phase $Na_4Ti_4Si_3O_{16} \cdot 6H_2O$, and $Na_4Ti_9O_{20} \cdot 5$ to $7H_2O$ were detected. The other crystalline silicotitanates and $TiO_2$ were undetected. |
| Example 3 | 2:1 | 1.64 | 4.36 | 6.00 | 2.51 | The main phase $Na_4Ti_4Si_3O_{16} \cdot 6H_2O$, and $Na_4Ti_9O_{20} \cdot 5$ to $7H_2O$ were detected. $Na_{8.72}Ti_5Si_{12}O_{38}(OH)(H_2O)_{15.4}$ as others was slightly detected. $TiO_2$ was undetected. |
| Comparative Example 1 | 2:1 | 2.43 | 6.46 | 8.89 | 3.32 | The main phase $Na_4Ti_4Si_3O_{16} \cdot 6H_2O$, and $Na_4Ti_9O_{20} \cdot mH_2O$ were undetected. $Na_2TiOSiO$ and $TiO_2$ as others were detected. |

TABLE 2

| | Ratio of Main Peak Heights (%) | Molar Ratio of Crystalline Silicotitanate:Sodium Titanate |
|---|---|---|
| Example 1 | 38.5 | 1:0.37 |
| Example 2 | 50.0 | 1:0.36 |
| Example 3 | 30.0 | 1:0.36 |

TABLE 3

| | Adsorption Time 1 Hour | | | | Adsorption Time 24 Hours | | | |
| --- | --- | --- | --- | --- | --- | --- | --- | --- |
| | Cs Adsorption | | Sr Adsorption | | Cs Adsorption | | Sr Adsorption | |
| | Concentration after Adsorption (ppm) | Adsorption Rate (%) | Concentration after Adsorption (ppm) | Adsorption Rate (%) | Concentration after Adsorption (ppm) | Adsorption Rate (%) | Concentration after Adsorption (ppm) | Adsorption Rate (%) |
| Example 1 | <3 | >97 | 0.01 | 99.99 | <3 | >97 | 0.01 | 99.99 |
| Example 2 | <3 | >97 | 0.02 | 99.98 | <3 | >97 | 0.02 | 99.98 |
| Example 3 | 5.7 | 94.6 | 0.09 | 99.90 | 6.7 | 93.8 | 0.03 | 99.97 |
| Comparative Example 1 | 12.8 | 88.1 | 0.02 | 99.98 | 13.1 | 87.8 | 0.02 | 99.98 |

It is clear from the results shown in Table 1 to Table 3 that each Example provides a crystalline silicotitanate represented by $Na_4Ti_4Si_3O_{16} \cdot nH_2O$ in the state of a stable coexistence with sodium titanate represented by $Na_4Ti_9O_{20} \cdot mH_2O$, that is, the adsorbent material according to the present invention. It is also clear that the adsorbent material (crystalline silicotitanate) can remove Cs and Sr contained in the mimic seawater in high adsorption rates. It is clear that the adsorbent material can adsorb and remove particularly Cs in a high adsorption rate. It is also clear that the employment of the production conditions of Examples 1 and 2 can suppress the remaining of an unreacted titanium source, and the by-production of crystalline silicotitanates other than the crystalline silicotitanate having a molar ratio of Ti:Si of 4:3.

By contrast, it is clear that Comparative Example 1 using titanium dioxide as the titanium source by-produces crystalline silicotitanates having molar ratios of Ti:Si of other than 4:3, and titanium oxide, and produced no $Na_4Ti_9O_{20} \cdot mH_2O$. Additionally, it is clear that the adsorbent material (crystalline silicotitanate) obtained in the Comparative Example 1, even if being able to adsorb and remove Sr in a high adsorption rate, is inferior in the adsorption efficiency of Cs.

Examples 4 to 6

Synthesis of Adsorbent Materials (Crystalline Silicotitanates)

(1) A First Step 120 g of the No. 3 soda silicate, 674 g of the caustic soda aqueous solution and 103 g of the caustic potash, and 247.4 g of pure water were mixed and stirred to thereby obtain a mixed aqueous solution. 610 g of the titanium tetrachloride aqueous solution (concentration: 15.3%) was added continuously over 1 hour to the mixed aqueous solution by a Perista pump to thereby produce a mixed gel. The mixed gel was, after the titanium tetrachloride aqueous solution was added, allowed to stand still for aging over 1 hour at room temperature. The molar ratio of Ti and Si in the mixed gel at this time was Ti:Si=2:1. Further, the concentration of $SiO_2$ in the mixed gel was 2.8%; the concentration of $TiO_2$ therein was 7.4%; and the total concentration of sodium and potassium therein in terms of $Na_2O$ was 3.5%.

(2) A Second Step

Figure 6:
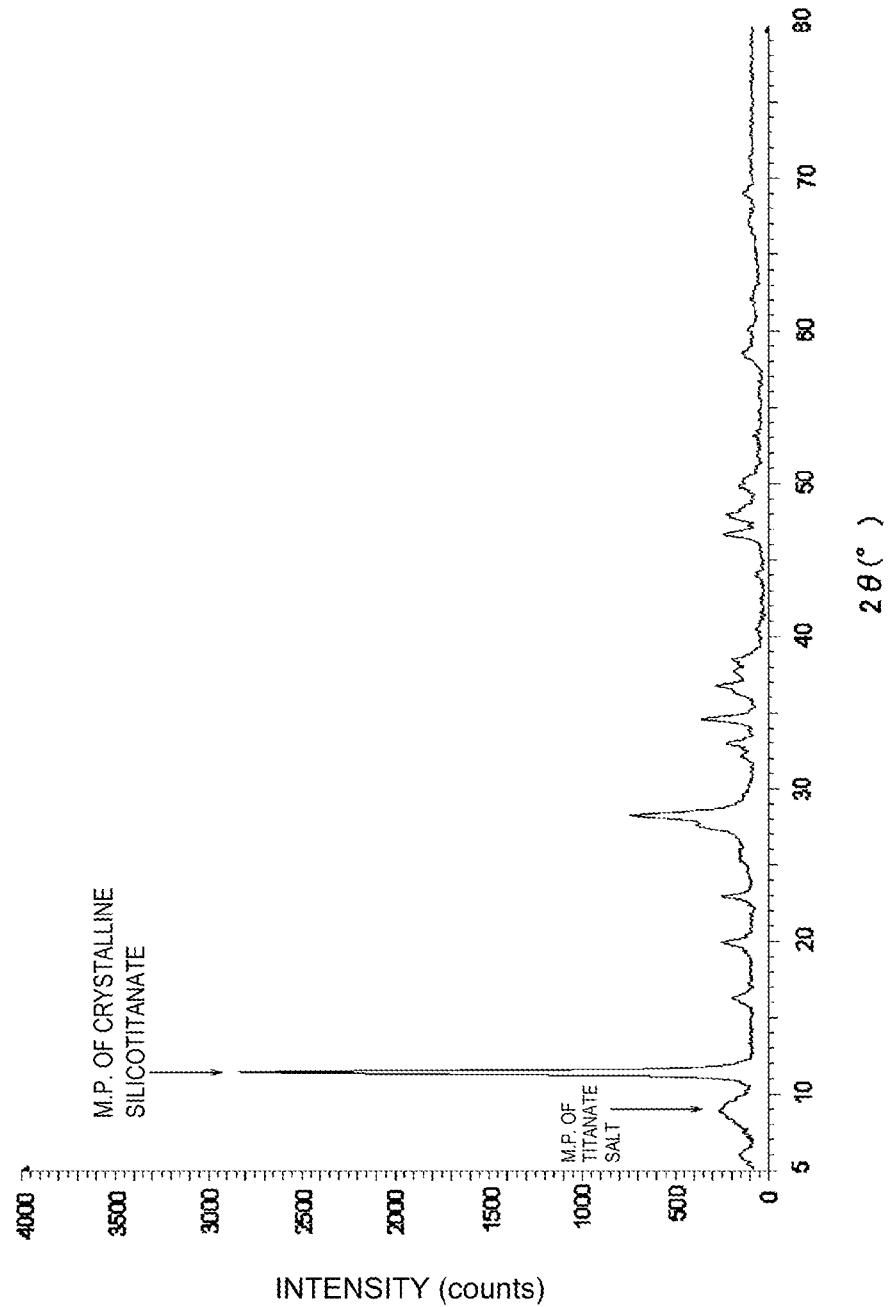
FIG. 6 is an X-ray diffraction chart after base line correction of an adsorbent material (crystalline silicotitanate) obtained in Example 6 in the present invention.

The mixed gel obtained in the first step was put in an autoclave; the temperature therein was raised to 140° C. over 3 hours; and while the temperature was maintained, the reaction was carried out under stirring over times indicated in Table 4. Slurries after the reaction were each filtered, cleaned and dried to thereby obtain an adsorbent material (crystalline silicotitanate). The obtained adsorbent material (crystalline silicotitanate) was subjected to the same analysis as in Example 1. The composition of the obtained adsorbent material (crystalline silicotitanate) estimated from an X-ray diffraction structure thereof is shown in the following Table 4. An X-ray diffraction chart after the base line correction of the adsorbent material (crystalline silicotitanate) obtained in Example 6 is shown in FIG. 6. In this X-ray diffraction chart, the main peak (originated from $Na_4Ti_4Si_3O_{16} \cdot 5$ to $7H_2O$, $Na_xK_{(1-x)})_4Ti_4Si_3O_{16} \cdot 5$ to $7H_2O$ or $K_4Ti_4Si_3O_{16} \cdot 5$ to $7H_2O$) of a crystalline silicotitanate and the main peak (originated from $Na_4Ti_9O_{20} \cdot 5$ to $7H_2O$, $(Na_yK_{(1-y)})_4Ti_9O_{20} \cdot 5$ to $7H_2O$ or $K_4Ti_9O_{20} \cdot 5$ to $7H_2O$) of a titanate salt were detected in the same diffraction angle ranges as in the adsorbent material obtained in Example 1. The peak height ratio acquired from FIG. 6 and the molar ratio obtained by the compositional analysis are shown in Table 5. Further for the adsorbent material (crystalline silicotitanate) obtained in Example 6, the following adsorption test of Cs and Sr was carried out.

<Adsorption Test of Cs and Sr>

0.3 g of the adsorbent material (crystalline silicotitanate) was dispersed in 300 ml of the mimic seawater, and stirred by a stirrer. After the lapses of 1, 2, 4 and 6 hours each after the dispersion, about 50 ml of the resultant mimic seawater was sampled. The sampled mimic seawater was filtered with a No. 5C filter paper, and an obtained filtrate was sampled. With the sampled filtrates being as subjects, the contents of Cs and Sr in the filtrates were measured using the ICP-AES. The results are shown in Table 6. Further the adsorbent material (crystalline silicotitanate) obtained in Example 1 was subjected to an adsorption test of Cs and Sr under the same condition as that in the adsorbent material (crystalline silicotitanate) obtained in Example 6, and the results are together shown in Table 6.

TABLE 4

| | Reaction Time | Ti:Si Molar Ratio | Concentration A in terms of $SiO_2$ (%) | Concentration B in terms of $TiO_2$ (%) | A + B | Concentration in terms of $Na_2O$ (%) (Na + K) | X-Ray Diffraction Structure |
|---|---|---|---|---|---|---|---|
| Example 4 | 24 | 2:1 | 2.8 | 7.4 | 10.2 | 3.5 | The main phase: at least one selected from $Na_4Ti_4Si_3O_{16} \cdot 6H_2O$, $(Na_xK_{(1-x)})_4Ti_4Si_3O_{16} \cdot 6H_2O$ and $K_4Ti_4Si_3O_{16} \cdot 6H_2O$, and at least one selected from $Na_4Ti_9O_{20} \cdot 5$ to $7H_2O$, $(Na_yK_{(1-y)})_4Ti_9O_{20} \cdot 5$ to $7H_2O$ and $K_4Ti_9O_{20} \cdot 5$ to $7H_2O$ were detected. The other crystalline silicotitanates and $TiO_2$ were undetected. |
| Example 5 | 48 | | | | | | the same as in the above |
| Example 6 | 72 | | | | | | the same as in the above |

TABLE 5

| | Ratio of Main Peak Heights (%) | Molar Ratio of Crystalline Silicotitanate:Titanate Salt |
|---|---|---|
| Example 4 | 7.0 | 1:0.32 |
| Example 5 | 5.8 | 1:0.33 |
| Example 6 | 6.6 | 1:0.33 |

TABLE 6

| | | Cs Adsorption | | Sr Adsorption | |
|---|---|---|---|---|---|
| Sample | Adsorption Time (h) | Concentration after Adsorption (ppm) | Adsorption Rate (%) | Concentration after Adsorption (ppm) | Adsorption Rate (%) |
| Example 6 | 1 | 18.6 | 80.8 | 19 | 81.1 |
| | 2 | 19 | 80.3 | 19 | 81.1 |
| | 4 | 19.4 | 79.9 | 20.1 | 80 |
| | 6 | 18.9 | 80.5 | 21.4 | 78.8 |
| Example 1 | 1 | 28.9 | 70.1 | 16.4 | 83.7 |
| | 2 | 27.8 | 71.2 | 16.6 | 83.5 |
| | 4 | 27.6 | 71.4 | 17.5 | 82.7 |
| | 6 | 23.7 | 75.5 | 24.5 | 75.7 |

It is clear from the results shown in Table 4 to Table 6 that also in Examples 4 to 6 each using a potassium compound in addition to a sodium compound in the first step, the crystalline silicotitanate can be obtained in the state of a stable coexistence with the titanate salt, that is, the adsorbent material according to the present invention can be obtained. It is also clear that the obtained adsorbent materials (crystalline silicotitanates) can adsorb and remove Cs and Sr contained in the mimic seawater in high adsorption rates.

It is also clear that the adsorbent materials (crystalline silicotitanates) of these Examples are more improved in the adsorption rate of Cs because they contain as a main component a crystalline silicotitanate in which a part of Na is replaced by K.

Examples 7 to 10

The slurry obtained by the hydrothermal reaction in the second step of Example 1 was cleaned, and the moisture rate thereof was regulated to 69.5% (solid content: 30.5%). The hydrous crystalline silicotitanate was charged in and extruded from a cylindrical hand extruder equipped on its front end with a screen having an opening diameter of 0.5 mm in terms of a true circle. A hydrous molded body extruded from the screen was dried at temperatures indicated in the following Table 7 at normal pressure for 1 day. The obtained dried materials were each lightly ground by an agate mortar. The obtained ground material was set on a sieve having a sieve opening of 710 μm. At this time, the oversize was again ground, and the ground material was all passed through the sieve having a sieve opening of 710 μm. The undersize was recovered and set on a sieve having a sieve opening of 300 μm. The oversize was recovered and taken as a sample.

Example 11

A sample was obtained as in Example 9, except that the dried material obtained from the hydrous molded body was, without being ground, put in a PP (propylene) bag, and lightly pounded, loosened and disintegrated by a rubber hammer. However, after the disintegrated material was set on a sieve having a sieve opening of 710 μm, the oversize was not further ground; then, only the disintegrated material having passed through the sieve having a sieve opening of 710 μm was set on a sieve having a sieve opening of 300 μm. The oversize was recovered and taken as the sample.

Example 12

A sample was obtained as in Example 9, except for using an extruder equipped with a screen having a screen opening of 1.5 mm in terms of a true circle in place of one having a screen opening of 0.5 mm.

<Adsorption Tests of Cs and Sr>

0.5 g of the sample adsorbent materials (crystalline silicotitanates) each obtained in Examples 7 to 12 was taken in a 100-ml poly container, and 100.00 g of the mimic seawater was added. After the lid was put on, the mixture was well shaken and mixed. Thereafter, the mixture was allowed to stand still, and after the lapse of 1 hour, the mixture was again shaken and mixed; about 50 ml of the mixture was filtered with a No. 5C filter paper, and a filtrate obtained by the filtration was sampled. The rest of 50 ml was allowed to stand still as it was, and after 23 hours (after 24 hours after the first shaking), was further again shaken and mixed. Then, the mixture was filtered with a No. 5C filter paper, and a filtrate obtained by the filtration was sampled. With the filtrate (whose adsorption time was 24 hours) sampled at the second time being as a subject, the contents of Cs and Sr in the filtrate were measured, and adsorption rates were determined. The results are shown in the following Table 7.

TABLE 7

| Sample | Drying Temperature (° C.) | Cs Adsorption Rate (%) | Sr Adsorption Rate (%) |
|---|---|---|---|
| Example 7 | 50 | 20.4 | 84.8 |
| Example 8 | 80 | 25.5 | 85.8 |
| Example 9 | 110 | 22.9 | 78.4 |
| Example 10 | 140 | 23.5 | 81.5 |
| Example 11 | 110 | 20.9 | 79.0 |
| Example 12 | 110 | 29.2 | 83.9 |

What is claimed is:

1. An adsorbent material for cesium or strontium, comprising: at least one selected from crystalline silicotitanates represented by the general formulae: $Na_4Ti_4Si_3O_{16}.nH_2O$, $(Na_xK_{(1-x)})_4Ti_4Si_3O_{16}.nH_2O$ and $K_4Ti_4Si_3O_{16}.nH_2O$ wherein x represents a number of more than 0 and less than 1 and n represents a number of 0 to 8; and at least one selected from titanate salts represented by the general formulae: $Na_4Ti_9O_{20}.mH_2O$, $(Na_yK_{(1-y)})_4Ti_9O_{20}.mH_2O$ and $K_4Ti_9O_{20}.mH_2O$ wherein y represents a number of more than 0 and less than 1 and m represents a number of 0 to 10.

2. The adsorbent material according to claim 1, wherein when the adsorbent material is subjected to an X-ray diffractometry using a Cu—Kα as an X-ray source and in a diffraction angle (2θ) range of 5 to 80°, one or more peaks of the crystalline silicotitanate are observed, and one or more peaks of the titanate salt are observed; and a ratio of a height of a main peak of the titanate salt to a height of a main peak of the crystalline silicotitanates is 5% or higher and 70% or lower.

3. The adsorbent material according to claim 1, wherein when the adsorbent material is subjected to an X-ray diffractometry using a Cu—Kα as an X-ray source and in a diffraction angle (2θ) range of 5 to 80°, the main peak of the titanate salt is observed in a diffraction angle (2θ) of 8 to 10°.

4. The adsorbent material according to claim 1, comprising $Na_4Ti_4Si_3O_{16}.nH_2O$ and $K_4Ti_4Si_3O_{16}.nH_2O$, or $(Na_xK_{(1-x)})_4Ti_4Si_3O_{16}.nH_2O$ as the crystalline silicotitanate.

5. The adsorbent material according to claim 1, wherein the adsorbent material is in a powdery form or a granular form.

* * * * *